2,993,052
NEW PYRAZOLONE DERIVATIVES
Johann Stenzl, Riehen, near Basel, and Franz Häfliger, Basel, Switzerland, assignors to Geigy Chemical Corporation, Ardsley, N.Y., a corporation of Delaware
No Drawing. Filed Mar. 15, 1960, Ser. No. 15,075
Claims priority, application Switzerland Mar. 16, 1959
7 Claims. (Cl. 260—306.8)

The present invention concerns new pyrazolone derivatives and their salts having valuable pharmacological properties, as well as a process for the production of these compounds.

It has surprisingly been found that pyrazolone derivatives of the general formula

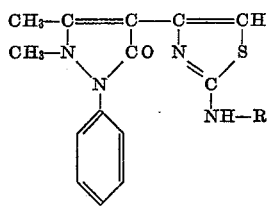

wherein R represents a low molecular alkyl or alkenyl radical or a phenyl or phenylalkyl radical, and their salts with inorganic or organic acids have excellent antiphlogistic and analgesic activity and, at the same time, only very slight toxicity. They can be used, for example as medicaments for the treatment of rheumatic diseases and can be administered either per os or parenterally.

The compounds of the general Formula I can be produced in a simple manner by reacting a 1-phenyl-2.3-dimethyl-4-halogen-acetyl-pyrazolone-(5) of the general formula

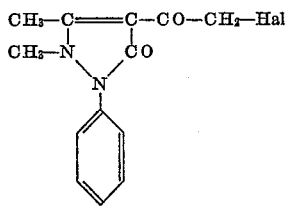

wherein Hal represents chlorine or bromine, with an N-monosubstituted thiourea of the general formula $$H_2N\text{—}CS\text{—}NH\text{—}R \qquad III$$

wherein R has the meaning given above, and, if desired, converting the reaction product of the general Formula I into a salt with an inorganic or organic acid.

The condensation to form compounds of the general Formula I occurs, for example, simply on boiling the reaction components in a low molecular alkanol, in particular ethanol. The 1-phenyl-2.3-dimethyl-4-chloracetyl-pyrazolone-(5) (M.P. 167°) has already been produced by H. P. Kaufmann et al., Ber. 75, 1243 (1943) by heating 1-phenyl-2.3-dimethyl-pyrazolone-(5) with chloracetyl chloride for 15 minutes at 100°. 1-phenyl-2.3-dimethyl-1.4-bromoacetyl-pyrazolone-(5) is obtained by brominating 1-phenyl-2.3-dimethyl-4-acetyl-pyrazolone-(5) while irradiating.

These pyrazolone derivatives can be reacted, for example, with N-methyl, N-ethyl, N-n-propyl- N-n-butyl, N-isobutyl, N-isoamyl, N-allyl, N-methallyl, N-benzyl, N-(β-phenylethyl), or N-phenyl thiourea.

The bases produced according to the invention form salts some of which are water soluble with organic or inorganic acids such as hydrochloric acid, hydrobromic acid, sulphuric acid, phosphoric acid, methane sulphonic acid, ethane disulphonic acid, acetic acid, citric acid, malic acid, succinic acid, fumaric acid, maleic acid, tartaric acid, benzoic acid and phthalic acid.

The following examples further illustrate the production of the new compounds without limiting the invention in any way. Parts are given therein as parts by weight and their relationship to parts by volume is as that of grammes to cubic centimetres. The temperatures are in degrees centigrade.

Example 1

27 parts of 1-phenyl-2.3-dimethyl-4-chloracetyl-pyrazolone-(5) and 10 parts of N-methyl thiourea in 200 parts by volume of ethanol are refluxed for 6 hours. After cooling, the reaction mixture is diluted with water to 1000 parts by volume and the clear solution is made alkaline with ammonia. The precipitated product is filtered off under suction, washed with water and recrystallised from ethanol.

The 1-phenyl-2.3-dimethyl-4-[2'-methylamino-thiazolyl-(4')]-pyrazolone-(5) melts at 176–178°.

The hydrochloride (M.P. 208–210° on decomposition) is obtained by dissolving the base in hot anhydrous ethanol and adding the calculated amount of ethanolic hydrochloric acid. The hydrochloride dissolves well in water with an almost neutral reaction.

Example 2

25 parts of 1-phenyl-2.3-dimethyl-4-bromacetyl-pyrazolone-(5), (produced by brominating 1-phenyl-2.3-dimethyl-4-acetyl-pyrazolone-(5) in glacial acetic acid while irradiating with a UV lamp, M.P. 148–149° (from benzene)), and 10 parts of N-ethyl-thiourea in 100 parts by volume of ethanol are refluxed for 3 hours. The clear solution obtained by diluting with 400 parts by volume of water is made alkaline with ammonia and the precipitate is filtered off under suction and washed. After recrystallising from 70% ethanol, 1-phenyl-2.3-dimethyl-4-[2'-ethylamino-thiazolyl-(4')]-pyrazolone-(5) is obtained. It melts at 163–165°. The hydrochloride melts at 208–211° (with decomposition).

1 - phenyl-2.3-dimethyl-4-[2'-n-propylamino - thiazolyl - (4')]-pyrazolone-(5), M.P. 170–171° (from ethanol), hydrochloride M.P. 187–190° (with decomposition); 1-phenyl - 2.3-dimethyl-4-[2'-allylamino-thiazolyl-(4')]-pyrazolone-(5), M.P. 172–173°, (from ethanol), hydrochloride M.P. 171–174° (with decomposition); 1-phenyl-2.3 - dimethyl-4[2'-(β-phenylethylamino)-thiazolyl-(4')]-(5) M.P. 145–146° (from ethanol); 1-phenyl-2.3-dimethyl-4-[2'-phenylamino-thiazolyl-(4')]-pyrazolone-(5) M.P. 243–245° (from excess ethanol), hydrochloride M.P. 102–106° (with decomposition) are obtained analogously to the two above examples.

What we claimed is:
1. Pyrazolone derivatives of the formula

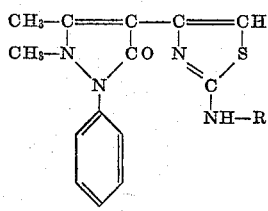

wherein R is a member selected from the group consisting of lower alkyl, lower alkenyl, phenyl and phenyl (lower) alkyl, and the therapeutically useful salts thereof.

2. 1-phenyl-2.3-dimethyl-[2′ - methylamino - thiazolyl-(4′)]-pyrazolone-(5).
3. 1-phenyl-2.3-dimethyl-4-[2′ - ethylamino - thiazolyl-(4′)]-pyrazolone-(5).
4. 1-phenyl-2.3-dimethyl-4-[2′ - n - propylamino - thiazolyl-(4′)]-pyrazolone-(5).
5. 1-phenyl-2.3-dimethyl-4-[2′ - allylamino - thiazolyl-(4′)]-pyrazolone-(5).
6. 1-phenyl-2.3-dimethyl-4-[2′-($\beta$ - phenylethylamino)-thiazolyl-(4′)]-pyrazolone-(5).
7. 1-phenyl-2.3.-dimethyl-4-[2′-phenylamino - thiazolyl-(4′)]-pyrazolone-(5).

No references cited.